United States Patent
Li et al.

(10) Patent No.: US 12,484,078 B2
(45) Date of Patent: *Nov. 25, 2025

(54) SCHEDULING METHOD, INFORMATION SENDING METHOD AND APPARATUS, AND STORAGE MEDIUM

(71) Applicant: XI'AN ZHONGXING NEW SOFTWARE CO., LTD., Shaanxi (CN)

(72) Inventors: Nan Li, Shenzhen (CN); Liang Li, Shenzhen (CN); Ronghui Hou, Shenzhen (CN); Zhiqiang Han, Shenzhen (CN); Ning Wei, Shenzhen (CN); Youxiong Lu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 857 days.

This patent is subject to a terminal disclaimer.

(21) Appl. No.: 17/750,494

(22) Filed: May 23, 2022

(65) Prior Publication Data
US 2022/0279503 A1   Sep. 1, 2022

Related U.S. Application Data

(63) Continuation of application No. 16/768,975, filed as application No. PCT/CN2018/114440 on Nov. 7, 2018, now Pat. No. 11,363,604.

(30) Foreign Application Priority Data

Dec. 5, 2017  (CN) .......................... 201711267636.2

(51) Int. Cl.
H04W 72/51   (2023.01)
H04W 28/26   (2009.01)
H04W 72/12   (2023.01)

(52) U.S. Cl.
CPC ........... *H04W 72/51* (2023.01); *H04W 28/26* (2013.01); *H04W 72/12* (2013.01)

(58) Field of Classification Search
CPC ..... H04W 4/029; H04W 28/26; H04W 36/00; H04W 36/30; H04W 72/04; H04W 72/048; H04W 72/12
See application file for complete search history.

(56) References Cited

U.S. PATENT DOCUMENTS

2004/0198386 A1   10/2004   Dupray

FOREIGN PATENT DOCUMENTS

| CN | 102625378 A | 8/2012 |
| CN | 103313407 A | 9/2013 |

(Continued)

OTHER PUBLICATIONS

Chinese Office Action for corresponding application 201711267636. 2: Report dated Mar. 31, 2021.

(Continued)

*Primary Examiner* — Khoa Huynh
(74) *Attorney, Agent, or Firm* — CANTOR COLBURN LLP

(57) ABSTRACT

Provided is a scheduling method. The method includes: receiving configuration information sent by a server, wherein the configuration information comprises at least one of: a transmission resource, a transmission cycle or an active retransmission location; and sending the configuration information to a terminal. Further disclosed are an information sending method and apparatus.

20 Claims, 5 Drawing Sheets

Receiving configuration information sent by a server — S601

Sending the configuration information to a terminal — S602

(56) References Cited

FOREIGN PATENT DOCUMENTS

| | | |
|---|---|---|
| CN | 105813086 A | 7/2016 |
| CN | 105933910 A | 9/2016 |
| CN | 105991243 A | 10/2016 |
| CN | 107040557 A | 8/2017 |
| CN | 107046700 A | 8/2017 |
| CN | 107295657 A | 10/2017 |
| JP | 2002217821 A | 8/2002 |
| JP | 2003188802 A | 7/2003 |
| JP | 2009271843 A | 11/2009 |
| JP | 2011124739 A | 6/2011 |
| JP | 2014003355 A * | 1/2014 |
| WO | 2015059494 A1 | 4/2015 |
| WO | 2015105183 A1 | 7/2015 |

OTHER PUBLICATIONS

Chinese Search Report for corresponding application 201711267636.2: Report dated Mar. 31, 2021.
European Search Report for corresponding application EP 18 88 5119; Report dated Aug. 16, 2021.
Indian Office Action for corresponding application 202027028466 filed Jul. 3, 2020, Report dated Jul. 13, 2021.
International Search Report for corresponding application PCT/CN2018/114440 filed Nov. 7, 2018; Mail date Jan. 17, 2019.
Japanese Office Action for corresponding Patent Application No. 2020-528086; Report dated May 12, 2021.

* cited by examiner

SCHEDULING METHOD, INFORMATION SENDING METHOD AND APPARATUS, AND STORAGE MEDIUM

CROSS-REFERENCES TO RELATED APPLICATIONS

This is a continuation of U.S. patent application Ser. No. 16/768,975, filed on Jun. 2, 2020, which is a National Stage Application, filed under 35 U.S.C. 371, of International Patent Application No. PCT/CN2018/114440, filed on Nov. 7, 2018, which claims priority to a Chinese patent application No. 201711267636.2 filed on Dec. 5, 2017, disclosure of which is incorporated herein by reference in its entirety.

TECHNICAL FIELD

The present disclosure relates to the field of wireless communications and, in particular, to a scheduling method and apparatus, an information sending method and apparatus, and a storage medium.

BACKGROUND

The semi-persistent scheduling (SPS) of Long Term Evolution (LTE) refers to that, in a scheduling transmission process, a base station indicates current scheduling information of a user through a Physical Downlink Control Channel (PDCCH) during initial scheduling, and if semi-persistent scheduling is identified by the user, the current scheduling information is stored, and the service data at the same resource location every fixed cycle is sent or received. Therefore, the cyclical characteristic of the data packet can be fully utilized by using the semi-static scheduling transmission, and once granted, the grant is use cyclically, which can effectively save PDCCH resources used for scheduling indication by an LTE system. The conventional SPS manner mainly aims at services with cyclical characteristics, such as Voice over Internet Protocol (VoIP), and adopts a fixed transmission cycle and resources randomly selected and allocated by the base station within an SPS stage, and meanwhile, provides transmission reliability guarantee through a Hybrid Automatic Repeat Request (HARQ) mechanism.

In the field of transportation communications, a terminal side (which may be a vehicle, a ship, an airplane, an electric vehicle, a bicycle or a person holding a terminal) needs to report real-time state information to a network side (such as a base station, a server and the like), where the real-time state information mainly includes a location, speed, acceleration and the like of the terminal itself. The size of such data packets is relatively fixed. However, because of the fast terminal moving speed and the rapid state update, the parameter configuration in the scheduling process in the related art is inflexible, which cannot satisfy the timely update of the terminal state when the terminal is under the high-speed travelling state.

SUMMARY

The present disclosure provides a scheduling method and apparatus, an information sending method and apparatus, and a storage medium, for solving the problem in the related art of slow terminal state update caused by inflexible parameter configuration of a scheduling method.

In order to solve the above technical problem, in a first aspect, the present disclosure provides a scheduling method. The scheduling method includes: determining configuration information according to a travelling trajectory of a terminal within a predetermined time period; and sending the configuration information to a base station to which the terminal currently belongs; where the configuration information includes at least one of: a transmission resource, a transmission cycle or an active retransmission location.

In a second aspect, the present disclosure further provides a scheduling method. The scheduling method includes: receiving configuration information sent by a server, where the configuration information includes at least one of: a transmission resource, a transmission cycle or an active retransmission location; and sending the configuration information to a terminal.

In a third aspect, the present disclosure further provides an information sending method. The information sending method includes: receiving configuration information sent by a base station, where the configuration information includes at least one of: a transmission resource, a transmission cycle or an active retransmission location; and sending travelling state information according to the configuration information.

In a fourth aspect, the present disclosure further provides a scheduling apparatus. The scheduling apparatus includes: a configuring module, which is configured to determine configuration information according to a travelling trajectory of a terminal within a predetermined time period; and a sending module, which is configured to send the configuration information to a base station to which the terminal currently belongs; where the configuration information includes at least one of: a transmission resource, a transmission cycle or an active retransmission location.

In a fifth aspect, the present disclosure further provides a scheduling apparatus. The scheduling apparatus includes: a first information receiving module, which is configured to receive configuration information sent by a server, where the configuration information includes at least one of: a transmission resource, a transmission cycle or an active retransmission location; and a first information sending module, which is configured to send the configuration information to a terminal.

In a sixth aspect, the present disclosure further provides an information sending apparatus. The information sending apparatus includes: a second information receiving module, which is configured to receive configuration information sent by a base station, where the configuration information includes at least one of: a transmission resource, a transmission cycle or an active retransmission location; and a second information sending module, which is configured to send travelling state information according to the configuration information.

In a seventh aspect, the present disclosure further provides a storage medium. The storage medium is configured to store computer programs for executing the above-mentioned scheduling method when the computer programs are executed by a processor.

In an eighth aspect, the present disclosure further provides a storage medium. The storage medium is configured to store computer programs for executing the above-mentioned information sending method when the computer programs are executed by a processor.

According to the present disclosure, by means of combining a prediction result of a travelling trajectory of a terminal within a predetermined time period, scheduling information parameter configuration, which complies with a travelling state of the terminal itself, is carried out for the terminal, so that the state of the terminal is acquired more timely, thereby solving the problem in the related art of slow terminal state update caused by inflexible parameter configuration of a scheduling method.

DETAILED DESCRIPTION

In order to solve the problem in the related art of slow terminal state update caused by inflexible parameter configuration of a scheduling method, the present disclosure provides a scheduling method and apparatus, an information sending method and apparatus, and a storage medium. The present disclosure will be described below in detail in conjunction with the drawings and embodiments. It should be understood that the specific embodiments described herein are intended to explain the present disclosure but not to limit the present disclosure.

Figure 1:
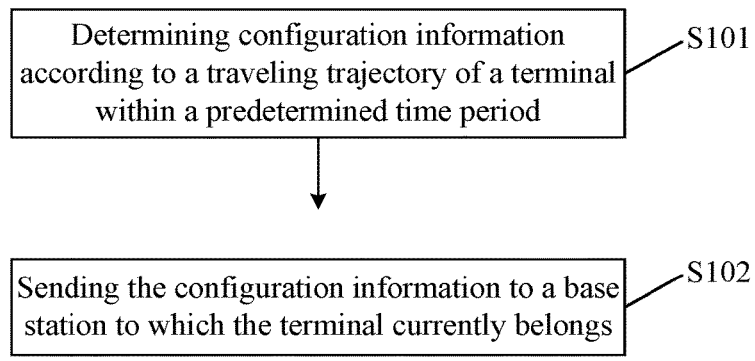
FIG. 1 is a flowchart of a scheduling method according to an embodiment of the present disclosure.

An embodiment of the present disclosure provides a scheduling method. The flowchart of the scheduling method is shown in FIG. 1, and the scheduling method specifically includes steps S102 and S102.

In S101, configuration information is determined according to a travelling trajectory of a terminal within a predetermined time period.

In S102, the configuration information is sent to a base station to which the terminal currently belongs, where the configuration information includes at least one of: a transmission resource, a transmission cycle or an active retransmission location.

In this embodiment, the terminal may be an independent apparatus, and is mounted on a transport vehicle such as a vehicle, a ship, an airplane, an electric vehicle, a bicycle, etc., or is held by a person so as to move or travel; or the terminal may be integrated in other devices and mounted on the above transport vehicle. The terminal may plan a travelling route according to travelling demands, or acquires the travelling route from other devices, for example, acquires a route shared with other devices. The method provided by this embodiment is applied to a network side device, for example, a device for managing and controlling a base station such as a server or a network controller. Multiple base stations are connected to this network side device, or an entity for implementing functions of this network side device is located inside a certain base station. The server is taken as example. The server acquires travelling state information of a terminal through a base station, and sends configuration information scheduled and determined by the server to the terminal through the base station.

The server, before determining the configuration information, first needs to acquire a travelling trajectory of the terminal within a predetermined time period. The travelling trajectory may be predicted by the server itself according to travelling state information of the terminal, or may be acquired by receiving a travelling trajectory prediction result sent by other intermediate device (such as a road side unit (RSU)) to the base station, where the travelling state information may include a current travelling speed, current location coordinates, route planning information and the like, and may further include acceleration, travelling time and other information of the terminal. When the travelling trajectory within the predetermined time period is predicted, the predetermined time period may be configured according to actual condition, for example, the predetermined time period may be configured as the total time required by the terminal from a start point to the end point, so as to save the signaling delivery, thereby further saving the air interface resources; or, the travelling trajectory may be predicted at fixed intervals (e.g., every 30 minutes), such that the travelling trajectory prediction may be more accurate, thereby enabling the subsequent transmission parameter configuration to be more flexible. The travelling trajectory prediction result may include: geographical location coordinates of the terminal at a specific moment, and identifier information of a base station where the terminal is located at a specific moment.

After the travelling trajectory of the terminal is determined, the configuration information is determined according to the travelling trajectory, where the configuration information may include a transmission resource, a transmission cycle and an active retransmission location. Specifically, when the server determines the transmission resource, cells covered by each base station use the same frequency domain resource, time required for the terminal to move to a handover execution region is determined according to the travelling state information of the terminal, and according to network state information of a target base station on the travelling trajectory, an idle time domain resource and an idle frequency domain resource of the target base station are allocated to the base station. Generally, the time-frequency domain resources are specifically expressed as numbers of sub-frames occupied, locations of frequency domain resources occupied, resource blocks, sub-channel information, etc. It should be understood that the target base station is a base station adjacent to the base station to which the terminal currently belongs, and the network state information of the target base station may include a radio resource configuration condition of the target base station, a service user identifier, a current network load, etc.

In the actual moving process of the terminal, since the terminal cyclically uploads the travelling state information, when the terminal is judged to be about to move to a handover execution region of the current cell to which the terminal belongs according to the current location information contained in the travelling state information, current available resources of the target base station are confirmed again, and the specific process can be as follows: the current resource allocation condition of the terminal is sent to the target base station, the target base station judges whether the current resources of the terminal are available in a cell covered by the target base station, and if the current resources are available, the target base station confirms that the resources are available and inform the server, and if the current resources are not available, the target base station reselects resources from current idle resources and informs the server of the resource configuration result. By determining the transmission resource for the terminal before handover, the terminal is prevented from applying for resources again after handover, the transmission interruption probability is reduced, the terminal is prevented from performing multiple times of resource reselection in the frequent handoff process as much as possible, thereby reducing the number of times of transmission resource reconfiguration, facilitating the optimization of the network resource configuration, and alleviating the problems of signaling overhead and resource waste caused by frequent reconfiguration.

In one optional embodiment, the handover execution region is generally located on the edge of the cell, and the manner of judging whether the terminal arrives the handover execution region may be as follows: whether the terminal arrives the handover execution region is determined according to current location coordinate information of the terminal and pre-stored cell coordinate information; or the terminal continuously measures downlink signal reception strength of the current base station, and when the measured value is less than a preset threshold, it indicates that the terminal enters the handover execution region.

Figure 2:
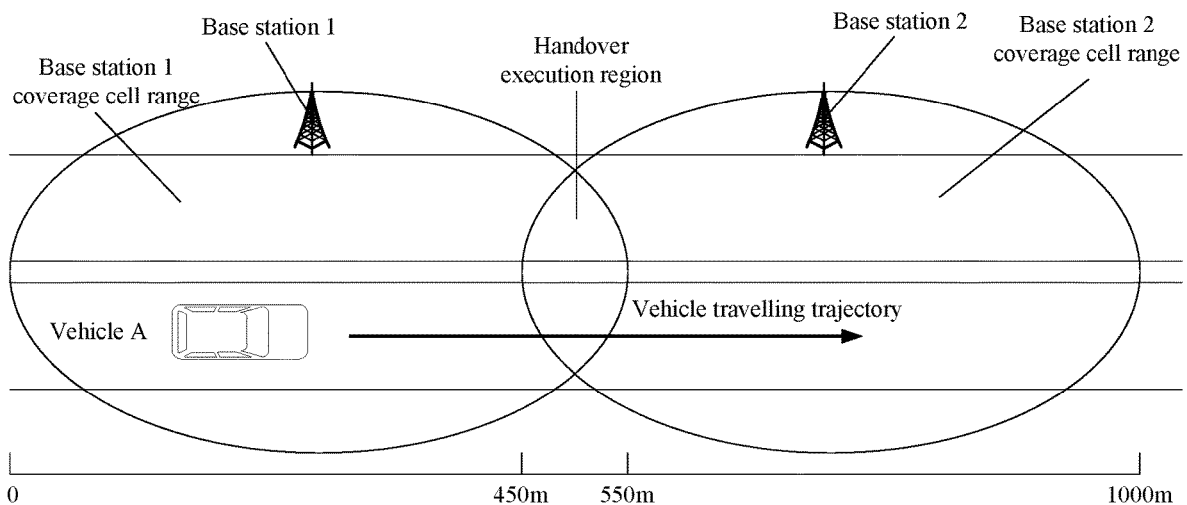
FIG. 2 is a schematic diagram illustrating a base station coverage range and a handover execution region according to an embodiment of the present disclosure.

The following uses the travelling of a vehicle terminal as an example in conjunction with FIG. 2 to describe a resource allocation process when the vehicle terminal moves to the handover execution region. The server pre-stores range distribution information expressed in the form of one-dimensional coordinate intervals of a base station 1 and a base station 2, which are (0, 500 m) and (500, 1000 m) respectively, and determines the range of the handover execution region to be (450, 550 m).

In step one, the server first acquires a travelling trajectory prediction result expressed in the form of coordinates of a vehicle A, and acquires current resource configuration information of base station 1 and 2 after judging that a travelling trajectory of the vehicle A needs to pass through cells covered by the base stations 1 and 2.

In step two, transmission resources are selected and allocated for the vehicle A from idle resources of the base station 1, a sub-frame number used in the first transmission is denoted as p, and resource selection should satisfy a condition that resources selected on (p+s/v) sub-frames are not occupied in the base station 2 (i.e., a target base station), where s is a distance from the current location of the vehicle A to the boundary of the handover region, v is a current speed of the vehicle A, and a ratio of s to v is in millisecond unit.

In step three, when the vehicle A travels into the handover execution region, the server confirms current available resource of the base station 2 again, and judges whether resources of the vehicle A which are used in the base station 1 are still available in the base station 2.

In step four, if the resources are still available in the base station 2, the base station 2 confirms that the resources are available; and if not, the base station 2 randomly re-selects resources from current idle resources for the vehicle A and informs the server of the resource configuration result, and the server further notifies the vehicle A through the base station 1, so as to ensure that the vehicle A can timely switch to the available resources of the base station 2 when travelling out of the handover execution region.

When the server determines the transmission cycle, the transmission cycle is determined according to the travelling state information of the terminal and a first mapping relationship.

The first preset mapping relationship includes a correspondence between a travelling speed in the travelling state information and the transmission cycle. Specifically, the first preset mapping relationship may be a first mapping table pre-established according to historical data or experience values, or may be a functional relationship that conforms to the mapping relationship. The travelling speed in the travelling state information may be a current travelling speed of the terminal, or calculated by averaging travelling speeds received continuously several times, and the transmission cycle is determined using the average travelling speed. In this embodiment, the first mapping table is used as a basis for determining the transmission cycle. The first mapping table is shown in Table 1. It should be understood that Table 1 only illustrates a preferred correspondence of this embodiment, and specific values in the table may be modified according to a service type of a terminal.

TABLE 1

| Average Speed Interval (km/h) | Transmission Cycle (ms) |
| --- | --- |
| (0, 20) | 175 |
| (20, 40) | 150 |
| (40, 60) | 125 |
| (60, 80) | 100 |
| . . . | . . . |

After the transmission resource and the transmission cycle are allocated to the terminal, the terminal occupies the transmission resource for transmission with the transmission cycle as the interval. For terminals in different travelling states, the network side (e.g. a server) requires different state information update frequencies. When the terminal travels fast, the state such as the terminal location and the like changes rapidly, and correspondingly, a faster state information update frequency should be set. Therefore, the terminal is required to perform data generation and reporting transmission with a smaller time granularity, so as to ensure that the network side has higher timeliness and reliability when executing relevant prediction and decision processes; and when the terminal is in a state of slowly travelling or temporarily stopping, the state such as the position, the speed and the like of the terminal is slowly updated, so that high-frequency repeated report is not needed.

Figure 3:
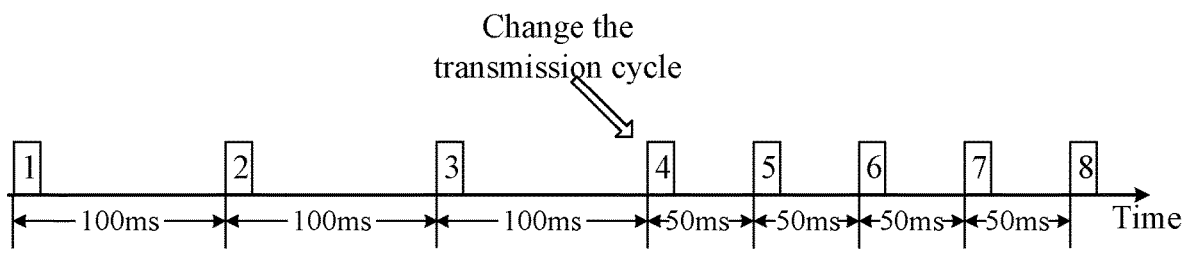
FIG. 3 is a schematic diagram illustrating transmission cycle adjustment according to an embodiment of the present disclosure.

In order to make the transmission more consistent with the travelling state of the terminal, this embodiment provides the following solution for optimizing the transmission cycle. The server re-determines the transmission cycle according to the average speed of travelling speeds of last few times (for example, five times) reported by the terminal, and judges whether the newly determined transmission cycle is the same as the current transmission cycle used by the terminal. If the two transmission cycles are the same, the transmission cycle does not need to be modified, and if the two transmission cycles are different, the new transmission cycle is used to replace the original transmission cycle in the configuration cycle, so that the terminal sends the travelling state information according to the new transmission cycle, so as to satisfy the state information update frequency required by the terminal. FIG. 3 is a schematic diagram illustrating the process of adjusting values of the transmission cycle. In the figure, the transmission cycle of the terminal is changed from 100 microsecond (ms) to 50 ms.

After the terminal performs transmission based on the transmission cycle and the certain number of times of transmission is reached, the travelling speed of the terminal may change, and the transmission cycle initially configured may not guarantee the timeliness of the current travelling speed; or the current speed is slow, and the travelling state information is not required to report rapidly. Therefore, values of the transmission cycle can be reconfigured, and the number of times is the transmission reconfiguration cycle. In the embodiments of the present disclosure, the server presets corresponding reconfiguration intervals for different transmission cycle values. The value range of the reconfiguration interval is set according to a rule of "the shorter the transmission cycle, the larger the number of transmissions". The transmission reconfiguration cycle is an integer in the preset reconfiguration interval corresponding to the transmission cycle. According to the transmission cycle actually configured to the terminal, a number is randomly selected from the corresponding preset reconfiguration interval and used as the transmission reconfiguration cycle. Since reporting travelling state information by the terminal is a long-term continuous service, which is different from VoIP, a terminal user does not actively stop uplink transmission unless the terminal is disconnected from the network. If the reconfiguration cycle is too short, it will cause frequent reconfigurations and increase control signaling overhead, but if the transmission reconfiguration cycle is too long, the flexibility of parameter configuration will be reduced, and the improvement of transmission performance will be affected. Therefore, the interval of the transmission reconfiguration cycle should be set with consideration of the above two factors. It should be understood that the configured transmission reconfiguration cycle may also be sent to the terminal as a part of the configuration information.

Figure 4:
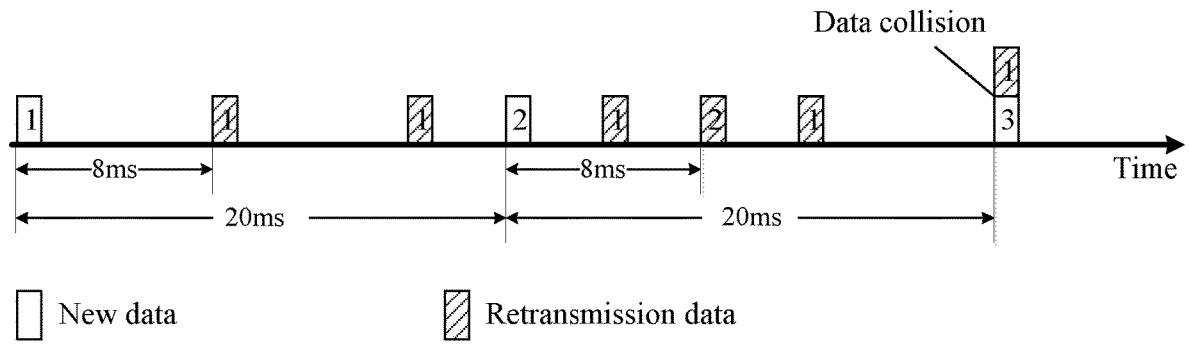
FIG. 4 is a schematic diagram illustrating data collision in the related art.

Further, for the problem in the related art of uplink data collision shown in FIG. 4 easily caused by the tedious use of HARQ technology, this embodiment provides an optimization solution: solving the problem by setting an active retransmission location, and avoiding a transmission error early through historical data and the prediction of the travelling trajectory. After the travelling trajectory of the terminal is acquired, N road locations passed by the travelling trajectory are acquired according to the travelling trajectory, N average channel gains corresponding to the N road locations are acquired in a second preset mapping relationship, a road location whose average channel gain is less than a preset average channel gain threshold is determined as the active retransmission location, and the determined M active retransmission locations are added into the configuration information and sent to the terminal when the configuration information is sent, where N is an integer greater than or equal to 1, M is an integer greater than or equal to 0, and M is less than or equal to N. It should be understood that a second mapping table may preferably be used as the second preset mapping relationship. Since the location of a signal shielding body such as a roadside building is relatively fixed and the distance between the base station and the road is fixed, the large-scale fading information of the channel between each location point of the terminal on the road and the base station may be predicted based on the statistical analysis of a large number of channel quality observation samples, and the average channel gain of potential communication links may be calculated, so as to further construct a "road location-average channel gain" mapping table for each cell coverage section, which is used as the second mapping table and mainly includes the correspondence between the road location and the average channel gain.

The steps of constructing and updating the second mapping table are as follows.

Figure 5:
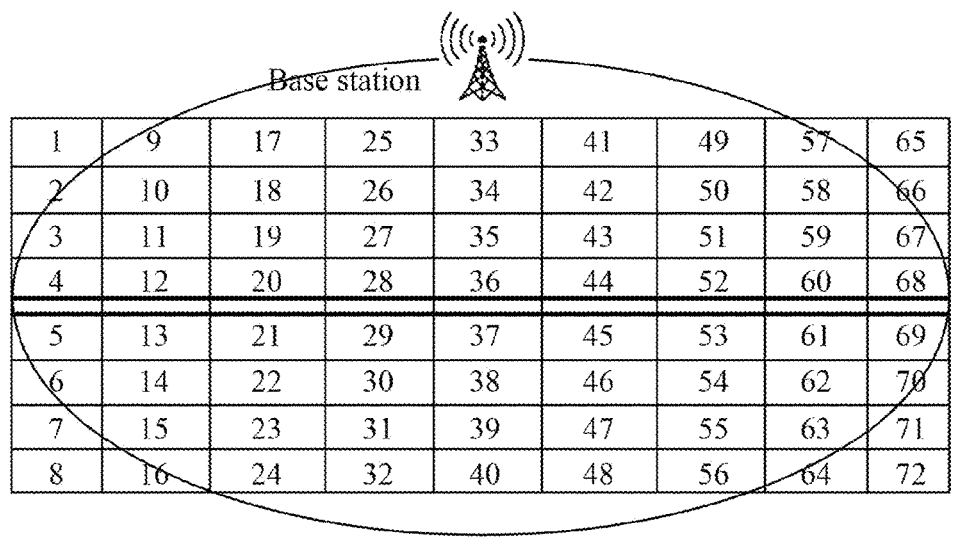
FIG. 5 is a schematic diagram illustrating road region partition and location index identifiers according to an embodiment of the present disclosure.

In step one, a coverage road section of each base station is portioned as multiple X×Y (such as 4 m×2 m) rectangular regions, and the regions are numbered in sequence as location index identifiers, as shown in FIG. 5.

In step two, in each rectangular region, the base station performs uplink channel detection on all mobile terminals which performs uplink communications, a channel gain value from each mobile terminal to the base station is acquired, the base station repeatedly performs the above collection operation on the uplink channel information of the terminal in each rectangular region for Z times (for example, 20 times) at a fixed time interval (such as, 1 minute), and uploads the road location indexes together with a corresponding set of channel gain values to the network side.

In step three, the network side collects and detects the data sample and carries on statistical analysis, calculates the average channel gain corresponding to each road location index, and constructs the second preset mapping table, as shown in Table 2.

In step four, since mobile terminals are randomly distributed in the road section, there may be a case that the number of mobile terminals at the statistical moment in some rectangular regions is zero, and for the rectangular region which lacks such a type of sample data, the network side takes the average channel gain of all rectangular regions adjacent to this rectangular region as the smoothing estimate value of the average channel gain of this rectangular region, and fills this smoothing estimate value in the second preset mapping table.

In step five, steps two to four are repeatedly performed at regular intervals to update the second preset mapping table, so as to ensure timeliness of the table contents.

TABLE 2

| Road Location Index | Average Channel Gain (dBm) |
|---|---|
| 0 | B |
| 1 | C |
| 2 | D |
| 3 | E |
| . . . | . . . |

In the actual moving process of the terminal, the travelling trajectory may change due to road congestion or temporary events, and in this case, the server re-acquires the travelling trajectory of the terminal. Therefore, the active retransmission location needs to be re-determined according to the new travelling trajectory, and sends the multiple determined active retransmission locations to the terminal. The travelling of the vehicle terminal is used as an example, and a specific embodiment of the determination and update of the active retransmission location is described below.

In step one, the vehicle location is represented by Global Positioning System (GPS) coordinates, and the server collects location speed information and route planning information of the vehicle uploaded by the base station.

In step two, with a current location as a start point and with t as a time granularity, location coordinates of the vehicle on a navigation path at each moment of t, 2t, 3t, . . . , and n×t are calculated, where n satisfies the following relation expression: n×t=floor (preset prediction distance/current speed), where the preset prediction distance is optionally 100 m.

In step three, within the time when the vehicle travels, the actual travelling trajectory expressed as location coordinate strings and information of location and speed of the vehicle are continuously received, and the updated travelling trajectory prediction result is acquired; if it is detected that the actual location of the vehicle deviates from a predicted trajectory, repeat step two to correct the trajectory prediction result; and if the actual location of the vehicle does not deviate from the predicted trajectory, when it is detected that the vehicle is in the n-th predicted location, repeat step two to add a new trajectory prediction result.

According to the updated trajectory prediction result, Table 2 is queried, a new active retransmission location point is determined, and the result is delivered to a base station to which the vehicle belongs.

In this embodiment, the server may receive a transmission resource allocation request uploaded by the base station, where the transmission resource allocation request may include travelling state information of the terminal, and may also include other information such as service data volume, time offset, service cycle, and priority of the terminal, and the server determines configuration information for the terminal according to the transmission resource allocation request.

In this embodiment, by means of combining a prediction result of a travelling trajectory of a terminal within a predetermined time period, scheduling information parameter configuration, which complies with a travelling state of the terminal itself, is carried out for the terminal, so that the state of the terminal is acquired more timely, thereby solving the problem in the related art of slow terminal state update caused by inflexible parameter configuration of a scheduling method.

Figure 6:
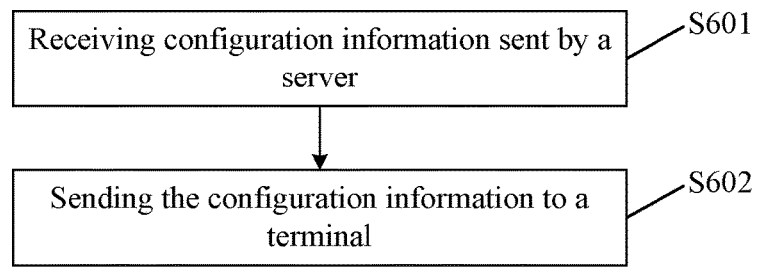
FIG. 6 is a flowchart of a scheduling method according to an embodiment of the present disclosure.

A second embodiment of the present disclosure provides a scheduling method. The flowchart of the scheduling method is shown in FIG. 6, and the method includes steps S601 and S602.

In S601, configuration information sent by a server is received, where the configuration information includes at least one of: a transmission resource, a transmission cycle, and an active retransmission location.

In S602, the configuration information is sent to a terminal.

The scheduling method provided by this embodiment is applied to a base station, and the base station is connected to a server providing configuration information, and is connected to multiple terminals. The base station receives travelling state information sent by a terminal and sends the travelling state information to the server, the server, after generating configuration information, delivers the configuration information to a base station, and the base station delivers the configuration information to a corresponding terminal, where the travelling state information uploaded by the terminal may include a current travelling speed, current location coordinates, route planning information and the like, and may further include information such as acceleration and travelling time of the terminal, and the configuration information may include a transmission resource, a transmission cycle, an active retransmission location, etc. In order to make a cycle in which the terminal sends the travelling state information more consistent with the moving state of the terminal, the server updates the transmission cycle according to a current raveling speed of the terminal, and sends the configuration information including the new transmission cycle to the base station, and the base station, after receiving the configuration information, sends the configuration information to the terminal, such that the terminal sends the travelling state information according to the new transmission cycle.

In some optional embodiments, before the configuration information sent by the server is received, the base station may also receive a transmission resource allocation request actively sent by the terminal, and send the transmission resource allocation request to the server, where the transmission resource allocation request may include travelling state information of the terminal, and may also include other information such as service data volume, time offset, service cycle, and priority of the terminal, such that the server determines the configuration information for the terminal according to the transmission resource allocation request.

For the problem in the related art of uplink data collision shown in FIG. 4 easily caused by the tedious use of HARQ technology, the configuration information delivered by the server may include an active retransmission location. When the configuration information received by the terminal includes the active retransmission location, according to the active retransmission location in conjunction with the travelling state of the terminal itself, the terminal obtains a retransmission slot on which the active retransmission needs to be performed, and sends the retransmission slot to the base station. The base station, after receiving the retransmission slot, judges whether the retransmission slot is reached. If the retransmission slot is not reached, the base station performs one conventional reception. If the retransmission slot is reached, the travelling state information sent by the terminal is received within continuous T slots, and after merge decoding is performed on the travelling state information sent by the terminal and received within the continuous T slots, sends the travelling state information to the server, but if the merge decoding fails, directly discards the travelling state information received this time and no longer performs retransmission. In some optional embodiment, T is an integer greater than or equal to 2. The base station, after receiving the retransmission slot, judges whether time-frequency resources of the base station itself are idle. If time-frequency resources of next (T−1) slots corresponding to the retransmission slot are idle, the base station reserves these resources for the terminal to perform retransmission. If the time-frequency resources of next (T−1) slots corresponding to the retransmission slot are occupied, the base station re-allocates retransmission resources for the terminal, and sends the retransmission resource indication information to the terminal.

After the terminal performs transmission based on the transmission cycle and the certain number of times of transmission is reached, the travelling speed of the terminal may change, and the transmission cycle initially configured may not guarantee the timeliness of the current travelling speed; or the current speed is slow, and the travelling state information is not required to report rapidly. Therefore, values of the transmission cycle can be reconfigured, and the number of times is the transmission reconfiguration cycle (denoted as Q). When the configuration information delivered by the server includes the transmission reconfiguration cycle, the base station counts the number of times that the terminal sends the travelling state information, that is, the number of transmissions. Before the number of transmissions reaches the transmission reconfiguration cycle determined by the server (usually after the (Q−1)-th transmission and before the Q-th transmission), the base station judges whether resource reconfiguration needs to be performed. When the resource reconfiguration needs to be performed, the base station requests the server to reconfigure the transmission resource, sends the configuration information delivered by the server that includes a new transmission resource to the terminal, and when the number of transmissions reaches Q, re-performs counting according to the transmission reconfiguration cycle in the configuration information. If the resource reconfiguration does not need to be performed, the base station sends configuration information containing an identifier that notifies the terminal that original configuration is unchanged to the terminal, and after the number of transmissions reaches Q, re-performs counting according to the current transmission reconfiguration cycle. The identifier with original configuration unchanged may be one-bit information bit for indicating whether the configuration changes. When the configuration is changed, new configuration parameter information (such as the new transmission resource) is carried in the configuration information; and if the configuration is not changed, it only indicates that the configuration does not change, and the configuration parameter information is no longer carried.

In this embodiment, the manner for the base station to judge whether the resource reconfiguration is performed is mainly to judge current frequency domain resource channel quality, such as signal strength, average signal to interference plus noise ratio and the like of the received signal of the base station. Judgement of the average signal to interference plus noise ratio of the received signal of the base station is used as an example. If the signal to interference plus noise ratio is greater than a preset average signal to interference plus noise ratio, it indicates that the current frequency domain resource channel quality is better, and the original transmission parameter configuration can be maintained without change. If the average received signal to interference plus noise ratio is less than the preset average signal to interference plus noise ratio, it indicates that the current frequency domain resource channel quality can hardly satisfy transmission requirements, and then a request is made to the server to reconfigure the transmission resource. In addition, when the server or the base station does not need the terminal to send the travelling state information, the configuration information sent by the base station further includes a sending stop identifier. The terminal, after receiving the configuration information that carries the sending stop identifier, actively stops sending the travelling state information to the base station, and releases the transmission resource.

In the scheduling method provided by this embodiment, the configuration information delivered by the server is timely sent to the terminal, and when parameters such as a transmission cycle, a transmission resource and an active retransmission location change, the terminal is timely notified through the configuration information to report the travelling state information according to the new transmission parameter, such that the scheduling is more consistent with the moving state of the terminal, and the reported information is more real-time.

Figure 7:
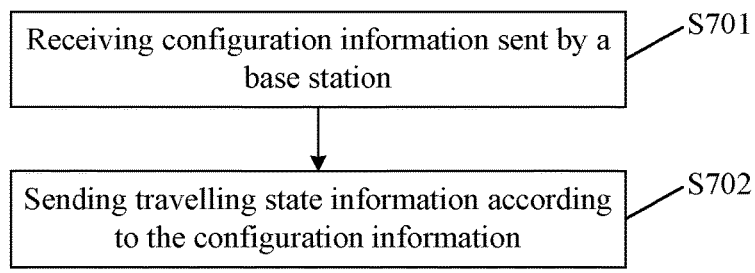
FIG. 7 is a flowchart of an information sending method according to an embodiment of the present disclosure.

An embodiment of the present disclosure provides an information sending method. The flowchart of the information sending method is shown in FIG. 7, and the method includes steps S701 and S702.

In S701, configuration information sent by a base station is received, where the configuration information includes at least one of: a transmission resource, a transmission cycle or an active retransmission location.

In S702, travelling state information is sent according to the configuration information.

The method provided by this embodiment is applied to a terminal, In this embodiment, the terminal may be an independent apparatus, and is mounted on a transport vehicle such as a vehicle, a ship, an airplane, an electric vehicle, a bicycle, etc., or is held by a person so as to move or travel; or the terminal may be integrated in other devices and mounted on the above transport vehicle. The terminal may plan a travelling route according to travelling demands, or acquires the travelling route from other devices, for example, acquires a route shared with other devices.

Before the terminal is scheduled, the terminal may actively send a transmission resource allocation request to the base station, where the transmission resource allocation request may include travelling state information, and may further include other information such as service data volume, time offset, service cycle, and priority of the terminal, such that the server determines the configuration information for the terminal according to the transmission resource allocation request. When the terminal does not actively send the transmission resource allocation request, the terminal can passively wait for the server to determine the configuration information, and then upload the travelling state information of the terminal itself according to the configuration information based on a law.

When the terminal sends the travelling state information of the terminal itself, the terminal may directly send the travelling state information to the current base station, and the base station sends the travelling state information to the server; or the terminal may send the travelling state information to an intermediate device, the prediction result and the travelling state information are directly sent to the base station after the intermediate device predicts a travelling trajectory, and then the base station sends the prediction result and the travelling state information to the server. Further, the terminal may only send route planning information of the terminal itself to the intermediate device, and the intermediate device acquires a current travelling speed and position coordinate information of the terminal through a sensor, a knotmeter, a RSU, GPS equipment, etc.

Figure 8:
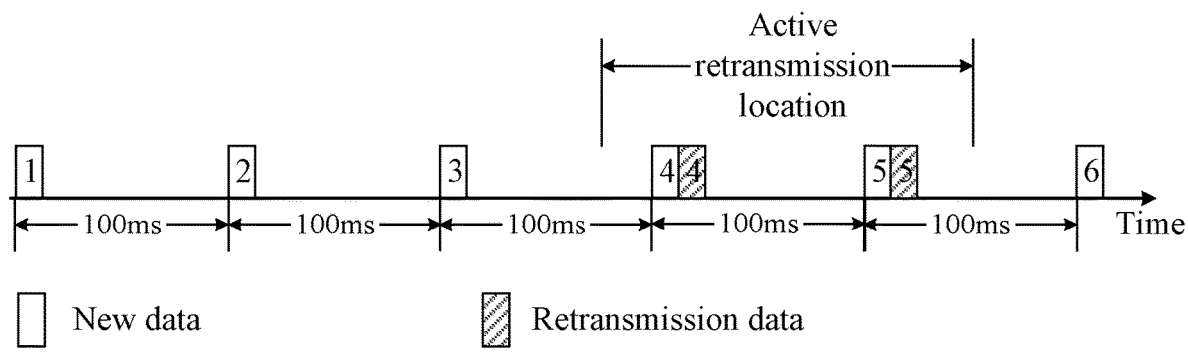
FIG. 8 is a schematic diagram illustrating terminal active retransmission according to an embodiment of the present disclosure.

After the terminal received the configuration information, the terminal sends the travelling state information according to the configuration information. For example, the terminal sends the travelling state information on corresponding time domain resources and frequency domain resources according to the transmission resource in the configuration information; or the terminal uploads its own travelling state information once per transmission cycle according to the transmission cycle in the configuration information; or when the configuration information includes the active retransmission location, the terminal initiates active retransmission when the active retransmission location is reached. It should be understood that, when the terminal judges that the configuration information includes the active retransmission location, the terminal first calculates a moment at which the terminal travels from a current location to the active retransmission location, and then according to the moment in conjunction with the current travelling speed and transmission cycle, determines a retransmission slot on which the active retransmission needs to be performed, and sends the retransmission slot to the base station. If the retransmission slot is not reached, one ordinary transmission is performed, and if the retransmission slot is reached, the same travelling state information is sent to the base station within continuous T slots, where T is an integer greater than or equal to 2. FIG. 8 is a schematic diagram illustrating active retransmission of the terminal when T=2. Through the active retransmission mechanism of the terminal, information transmission quality is improved, reliability in the transmission process is increased, and the problem in the related art of the data collision caused by the continuous retransmission of uplink data is avoided.

When the travelling trajectory of the terminal deviates from a predicted traveling trajectory, the server re-predicts the traveling trajectory according to the traveling state information constantly uploaded by the terminal, re-determines the active retransmission location according to the re-predicted traveling trajectory, and notifies the terminal of the active retransmission location through the base station. The terminal, after receiving the new active retransmission location, re-determines the retransmission slot, sends the re-determined retransmission slot to the base station, and initiates the active retransmission when the re-determined retransmission slot is reached.

The server, after determining the transmission cycle, also determines the transmission reconfiguration cycle according to the transmission cycle, and sends the transmission reconfiguration cycle together with the transmission cycle to the terminal through the base station. When the terminal receives the configuration information including the transmission reconfiguration cycle, the terminal counts number of times of sending the travelling state information by the terminal itself, and judges whether the configuration information delivered by the base station is received before the number of sending times reaches the transmission reconfiguration cycle. When the configuration information is not received and the number of sending times reaches the transmission reconfiguration cycle, the terminal stops sending the travelling state information to the base station, and releases a transmission resource currently used by the terminal; and when the configuration information is received and the number of sending times reaches the transmission reconfiguration cycle, the terminal sends the travelling state information to the base station according to the configuration information, and re-counts the number of sending times. Specifically, the terminal sends the travelling state information to the base station according to the specific content of the configuration information. In condition that the configuration information includes a new transmission resource, the terminal sends the travelling state information to the base station according to the new transmission resource. In condition that the configuration information includes an identifier that notifies the terminal that original configuration is unchanged, the terminal sends the travelling state information to the base station according to the original configuration information.

By counting the number of sending times by the terminal side, the terminal is enabled to automatically stop sending after the number of sending times is reached. For example, when the vehicle cannot successfully receive the configuration information delivered by the base station when travelling out of the cell coverage range, the terminal can automatically stop transmission timely. In addition, counting the number of sending times by the terminal side can enable the terminal user to acquire transmission parameters for the next stage before the transmission in the current stage is finished, preventing the user from actively requesting a grant for reconfiguration after completing the current transmission, so as to ensure the scheduling continuity, so that the transmission of the adjacent two stages can be connected seamlessly and the scheduling reliability can be enhanced.

The information sending method provided by this embodiment enables the terminal to send the travelling state information according to the configuration information delivered by the server, and makes the information sending process more consistent with the mobile characteristics of the terminal, such that the scheduling process is more complete and more flexible.

Figure 9:
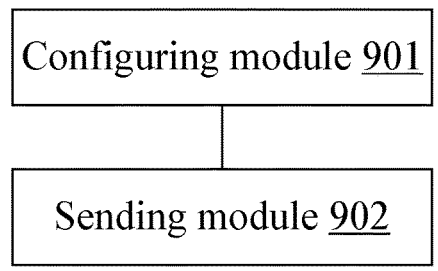
FIG. 9 is an optional structural diagram of a scheduling apparatus according to an embodiment of the present disclosure.

An embodiment of the present disclosure further provides a scheduling apparatus. The structural diagram of the scheduling apparatus is shown in FIG. 9 and the apparatus mainly includes a configuring module 901 and a sending module 902. The configuring module 901 is configured to determine configuration information according to a travelling trajectory of a terminal within a predetermined time period. The sending module 902 is configured to send the configuration information to a base station to which the terminal currently belongs. The configuration information includes at least one of: a transmission resource, a transmission cycle or an active retransmission location.

In this embodiment, the terminal may be an independent apparatus, and is mounted on a transport vehicle such as a vehicle, a ship, an airplane, an electric vehicle, a bicycle, etc., or is held by a person so as to move or travel; or the terminal may be integrated in other devices and mounted on the above transport vehicle. The terminal may plan a travelling route according to travelling demands, or acquires the travelling route from other devices, for example, acquires a route shared with other devices. The scheduling apparatus provided by this embodiment is applied to a network side device, for example, a device for managing and controlling a base station such as a server or a network controller. Multiple base stations are connected to this network side device, or an entity for implementing functions of this network side device is located inside a certain base station. The server is taken as example. The server acquires travelling state information of a terminal through a base station, and sends configuration information scheduled and determined by the server to the terminal through the base station.

The configuring module 901, before determining the configuration information, needs to acquire a travelling trajectory of the terminal within a predetermined time period through an acquiring module. The travelling trajectory may be predicted by the acquiring module itself according to travelling state information of the terminal, or may be acquired by receiving a travelling trajectory prediction result sent by other intermediate device to the base station, where the travelling state information may include a current travelling speed, current location coordinates, route planning information and the like, and may further include acceleration, travelling time and other information of the terminal. When the acquiring module predicts the travelling trajectory within the predetermined time period, the predetermined time period may be configured according to actual condition, for example, the predetermined time period may be configured as the total time required by the terminal from a start point to the end point, so as to save the signaling delivery, thereby further saving the air interface resources;

or, the travelling trajectory may be predicted at fixed intervals (e.g., every 30 minutes), such that the travelling trajectory prediction may be more accurate, thereby enabling the subsequent transmission parameter configuration to be more flexible. The travelling trajectory prediction result may include: geographical location coordinates of the terminal at a specific moment, and identifier information of a base station where the terminal is located at a specific moment.

After the acquiring module determines the travelling trajectory of the terminal, the configuring module 901 determines the configuration information according to the travelling trajectory, where the configuration information may include a transmission resource, a transmission cycle, and an active retransmission location. Specifically, when the configuring module 901 determines the transmission resource, cells covered by each base station use the same frequency domain resource, time required for the terminal to move to a handover execution region is determined according to the travelling state information of the terminal, and according to network state information of a target base station on the travelling trajectory, an idle time domain resource and an idle frequency domain resource of the target base station are allocated to the base station. Generally, the time-frequency domain resources are specifically expressed as numbers of sub-frames occupied, locations of frequency domain resources occupied, resource blocks, sub-channel information, etc. It should be understood that the target base station is a base station adjacent to the base station to which the terminal currently belongs, and the network state information of the target base station may include a radio resource configuration condition of the target base station, a service user identifier, a current network load, etc.

In the actual moving process of the terminal, since the terminal cyclically uploads the travelling state information, when the configuring module 901 judges that the terminal is about to move to a handover execution region of the current cell to which the terminal belongs according to the current location information contained in the travelling state information, the configuring module 901 confirms current available resources of the target base station again, and the specific process can be as follows: the current resource allocation condition of the terminal is sent to the target base station, the target base station judges whether the current resources of the terminal are available in a cell covered by the target base station, and if the current resources are available, the target base station confirms that the resources are available and inform the configuring module 901, and if the current resources are not available, the target base station reselects resources from current idle resources and informs the configuring module 901 of the resource configuration result. By determining the transmission resource for the terminal before handover, the terminal is prevented from applying for resources again after handover, the transmission interruption probability is reduced, the terminal is prevented from performing multiple times of resource reselection in the frequent handoff process as much as possible, thereby reducing the number of times of transmission resource reconfiguration, facilitating the optimization of the network resource configuration, and alleviating the problems of signaling overhead and resource waste caused by frequent reconfiguration.

In some optional embodiments, the handover execution region is generally located on the edge of the cell, and the manner of judging whether the terminal arrives the handover execution region may be as follows: whether the terminal arrives the handover execution region is determined according to current location coordinate information of the terminal and pre-stored cell coordinate information; or the terminal continuously measures downlink signal reception strength of the current base station, and when the measured value is less than a preset threshold, it indicates that the terminal enters the handover execution region. The travelling of a vehicle terminal is used as an example, and the resource allocation process when the vehicle terminal moves to the handover execution region is the same as the four steps in the first embodiment of the present disclosure, which will not be repeated herein.

The configuring module 901, when determining a transmission cycle, determines the transmission cycle according to the travelling state information of the terminal and a first preset mapping relationship. The first preset mapping relationship includes a correspondence between a travelling speed in the travelling state information and the transmission cycle. Specifically, the first preset mapping relationship may be a first mapping table pre-established according to historical data or experience values, or may be a functional relationship that conforms to the mapping relationship. The travelling speed in the travelling state information may be a current travelling speed of the terminal, or calculated by averaging travelling speeds received continuously several times, and the transmission cycle is determined using the average travelling speed. In this embodiment, the first mapping table is used as a basis for determining the transmission cycle. The first mapping table is shown in Table 1. It should be understood that Table 1 only illustrates a preferred correspondence of this embodiment, and specific values in the table may be modified according to a service type of a terminal.

After the transmission resource and the transmission cycle are allocated to the terminal, the terminal occupies the transmission resource for transmission with the transmission cycle as the interval. For terminals in different travelling states, the network side requires different state information update frequencies. When the terminal travels fast, the state such as the terminal location and the like changes rapidly, and correspondingly, a faster state information update frequency should be set. Therefore, the terminal is required to perform data generation and reporting transmission with a smaller time granularity, so as to ensure that the network side has higher timeliness and reliability when executing relevant prediction and decision processes; and when the terminal is in a state of slowly travelling or temporarily stopping, the state such as the position, the speed and the like of the terminal is slowly updated, so that high-frequency repeated report is not needed.

In order to make the transmission more consistent with the travelling state of the terminal, this embodiment provides the following solution for optimizing the transmission cycle. The configuring module 901 re-determines the transmission cycle according to the average speed of travelling speeds of last few times (for example, five times) reported by the terminal, and judges whether the newly determined transmission cycle is the same as the current transmission cycle used by the terminal. If the two transmission cycles are the same, the transmission cycle does not need to be modified, and if the two transmission cycles are different, the new transmission cycle is used to replace the original transmission cycle in the configuration cycle, so that the terminal sends the travelling state information according to the new transmission cycle, so as to satisfy the state information update frequency required by the terminal.

After the terminal performs transmission based on the transmission cycle and the certain number of times of transmission is reached, the travelling speed of the terminal may change, and the transmission cycle initially configured may not guarantee the timeliness of the current travelling speed; or the current speed is slow, and the travelling state information is not required to report rapidly. Therefore, values of the transmission cycle can be reconfigured, and the number of times is the transmission reconfiguration cycle. In the embodiments of the present disclosure, the configuring module 901 presets corresponding reconfiguration intervals for different transmission cycle values. The value range of the reconfiguration interval is set according to a rule of "the shorter the transmission cycle, the larger the number of transmissions". The transmission reconfiguration cycle is an integer in the preset reconfiguration interval corresponding to the transmission cycle. According to the transmission cycle actually configured to the terminal, a number is randomly selected from the corresponding preset reconfiguration interval and used as the transmission reconfiguration cycle. Since reporting travelling state information by the terminal is a long-term continuous service (different from VoIP), a terminal user does not actively stop uplink transmission unless the terminal is disconnected from the network. If the reconfiguration cycle is too short, it will cause frequent reconfigurations and increase control signaling overhead, but if the transmission reconfiguration cycle is too long, the flexibility of parameter configuration will be reduced, and the improvement of transmission performance will be affected. Therefore, the interval of the transmission reconfiguration cycle should be set with consideration of the above two factors. It should be understood that the configured transmission reconfiguration cycle may also be sent to the terminal as a part of the configuration information.

Further, for the problem in the related art of uplink data collision shown in FIG. 4 easily caused by the tedious use of HARQ technology, this embodiment provides an optimization solution: solving the problem by setting an active retransmission location, and avoiding a transmission error early through historical data and the prediction of the travelling trajectory. After the acquiring module acquires the travelling trajectory of the terminal, the configuring module 901 acquires N road locations passed by the travelling trajectory according to the travelling trajectory, acquires N average channel gains corresponding to the N road locations in a second preset mapping relationship, determines a road location whose average channel gain is less than a preset average channel gain threshold as the active retransmission location, and the sending module 902 adds the determined M active retransmission locations into the configuration information and sends it to the terminal when the sending module 902 sends the configuration information, where N is an integer greater than or equal to 1, M is an integer greater than or equal to 0, and M is less than or equal to N. It should be understood that a second mapping table may preferably be used as the second preset mapping relationship. Since the location of a signal shielding body such as a roadside building is relatively fixed and the distance between the base station and the road is fixed, the large-scale fading information of the channel between each location point of the terminal on the road and the base station may be predicted based on the statistical analysis of a large number of channel quality observation samples, and the average channel gain of potential communication links may be calculated, so as to further construct a "road location-average channel gain" mapping table for each cell coverage section, which is used as the second mapping table and mainly includes the correspondence between the road location and the average channel gain. It should be understood that steps of constructing and updating the second mapping table is the same as the five steps in the first embodiment of the present disclosure, which will not be repeated herein.

In the actual moving process of the terminal, the travelling trajectory may change due to road congestion or temporary events, and in this case, the acquiring module re-acquires the travelling trajectory of the terminal. Therefore, the configuring module 901 needs to re-determine the active retransmission location according to the new travelling trajectory, and send the multiple determined active retransmission locations to the terminal through the sending module 902. In the travelling process of the vehicle terminal, specific steps of determining and updating the active retransmission location are the same as the three steps in the first embodiment of the present disclosure, which will not be repeated herein.

In this embodiment, the scheduling apparatus further comprises a configuring module configured to receive a transmission resource allocation request uploaded by the base station, where the transmission resource allocation request may include travelling state information of the terminal, and may further include other information such as service data volume, time offset, service cycle, and priority of the terminal, such that the configuring module 901 determines the configuration information for the terminal according to the transmission resource allocation request.

In this embodiment, by means of combining a prediction result of a travelling trajectory of a terminal within a predetermined time period, scheduling information parameter configuration, which complies with a travelling state of the terminal itself, is carried out for the terminal, so that the state of the terminal is acquired more timely, thereby solving the problem in the related art of slow terminal state update caused by inflexible parameter configuration of a scheduling method.

Figure 10:
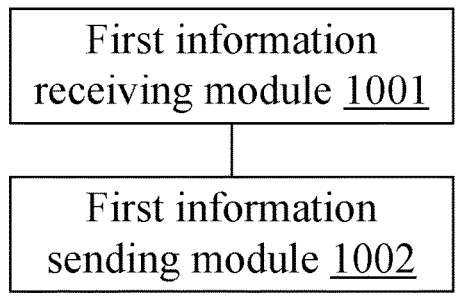
FIG. 10 is another optional structural diagram of a scheduling apparatus according to an embodiment of the present disclosure.

An embodiment of the present disclosure further provides another scheduling apparatus. The scheduling apparatus is mounted on a base station and is mainly used for transmission scheduling of travelling state information and configuration information. The structural diagram of the scheduling apparatus is shown in FIG. 10 and the apparatus mainly includes a first information receiving module 1001 and a first information sending module 1002. The first information receiving module 1001 is configured to receive configuration information sent by a server, where the configuration information includes at least one of: a transmission resource, a transmission cycle or an active retransmission location. The first information sending module 1002 is configured to send the configuration information to a terminal.

The first information receiving module 1001 receives travelling state information sent by a terminal and sends the travelling state information to the server through the first information sending module 1002, the server, after generating configuration information, delivers the configuration information to the first information receiving module 1001 of the base station, and the first information sending module 1002 delivers the configuration information to a corresponding terminal, where the travelling state information uploaded by the terminal may include a current travelling speed, current location coordinates, route planning information and the like, and may further include information such as acceleration and travelling time of the terminal, and the configuration information may include a transmission resource, a transmission cycle, an active retransmission location, etc. In order to make a cycle in which the terminal sends the travelling state information more consistent with the moving state of the terminal, the server updates the transmission cycle according to a current raveling speed of the terminal, and sends the configuration information including the new transmission cycle to the scheduling apparatus, and the scheduling apparatus, after receiving the configuration information including the new transmission cycle, sends the configuration information to the terminal through the first information sending module 1002, such that the terminal sends the travelling state information according to the new transmission cycle.

Further, before receiving the configuration information sent by the server, the first information receiving module 1001 may also receive a transmission resource allocation request actively sent by the terminal, and send the transmission resource allocation request to the server through the first information sending module 1002, where the transmission resource allocation request may include travelling state information of the terminal, and may also include other information such as service data volume, time offset, service cycle, and priority of the terminal, such that the server determines the configuration information for the terminal according to the transmission resource allocation request.

For the problem in the related art of uplink data collision easily caused by the tedious use of HARQ technology, the configuration information delivered by the server may include an active retransmission location. When the configuration information received by the terminal includes the active retransmission location, according to the active retransmission location in conjunction with the travelling state of the terminal itself, the terminal obtains a retransmission slot on which the active retransmission needs to be performed, and sends the retransmission slot to the first information receiving module 1001. The first information receiving module 1001, after receiving the retransmission slot, judges whether the retransmission slot is reached. If the retransmission slot is not reached, the first information receiving module 1001 performs one conventional reception. If the retransmission slot is reached, the first information receiving module 1001 receives the travelling state information sent by the terminal within continuous T slots, and after merge decoding is performed on the travelling state information sent by the terminal and received within the continuous T slots, sends the travelling state information to the server through the first information sending module 1002, but if the merge decoding fails, directly discards the travelling state information received this time and no longer performs retransmission. In some optional embodiment, T is an integer greater than or equal to 2. The first information receiving module 1001, after receiving the retransmission slot, judges whether time-frequency resources of the base station itself are idle. If time-frequency resources of next (T−1) slots corresponding to the retransmission slot are idle, the first information receiving module 1001 reserves these resources for the terminal to perform retransmission. If the time-frequency resources of next (T−1) slots corresponding to the retransmission slot are occupied, the first information receiving module 1001 re-allocates retransmission resources for the terminal, and sends the retransmission resource indication information to the terminal.

After the terminal performs transmission based on the transmission cycle and the certain number of times of transmission is reached, the travelling speed of the terminal may change, and the transmission cycle initially configured may not guarantee the timeliness of the current travelling speed; or the current speed is slow, and the travelling state information is not required to report rapidly. Therefore, values of the transmission cycle can be reconfigured, and the number of times is the transmission reconfiguration cycle (denoted as Q). When the configuration information delivered by the server includes the transmission reconfiguration cycle, a first counting module counts the number of times that the terminal sends the travelling state information, that is, the number of transmissions. Before the number of transmissions reaches the transmission reconfiguration cycle determined by the server (usually after the (Q−1)-th transmission and before the Q-th transmission), the first counting module judges whether resource reconfiguration needs to be performed. When the resource reconfiguration needs to be performed, the first counting module requests the server to reconfigure the transmission resource, sends the configuration information delivered by the server that includes a new transmission resource to the terminal through the first information sending module 1002, and when the number of transmissions reaches Q, re-performs counting according to the transmission reconfiguration cycle in the configuration information. If the resource reconfiguration does not need to be performed, the first counting module sends configuration information containing an identifier that notifies the terminal that original configuration is unchanged to the terminal, and after the number of transmissions reaches Q, re-performs counting according to the current transmission reconfiguration cycle. The identifier with original configuration unchanged may be a one-bit information bit for indicating whether the configuration changes. When the configuration is changed, new configuration parameter information is carried in the configuration information; and if the configuration is not changed, it only indicates that the configuration does not change, and the configuration parameter information is no longer carried.

In this embodiment, the manner for the first counting module to judge whether the resource reconfiguration is performed is mainly to judge current frequency domain resource channel quality, such as signal strength, average signal to interference plus noise ratio and the like of the received signal of the base station. Judgement of the average signal to interference plus noise ratio of the received signal of the base station is used as an example. If the signal to interference plus noise ratio is greater than a preset average signal to interference plus noise ratio, it indicates that the current frequency domain resource channel quality is better, and the original transmission parameter configuration can be maintained without change. If the average received signal to interference plus noise ratio is less than the preset average signal to interference plus noise ratio, it indicates that the current frequency domain resource channel quality can hardly satisfy transmission requirements, and then a request is made to the server to reconfigure the transmission resource. In addition, when the server or the base station does not need the terminal to send the travelling state information, the configuration information sent by the first information sending module 1002 further includes a sending stop identifier. The terminal, after receiving the configuration information that carries the sending stop identifier, actively stops sending the travelling state information to the base station, and releases the transmission resource.

Figure 11:
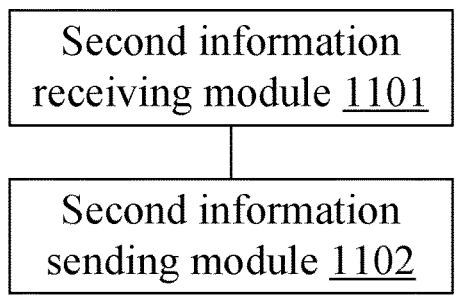
FIG. 11 is a structural diagram of an information sending apparatus according to an embodiment of the present disclosure.

In the scheduling apparatus provided by this embodiment, the configuration information delivered by the server is timely sent to the terminal, and when parameters such as a transmission cycle, a transmission resource and an active retransmission location change, the terminal is timely notified through the configuration information to report the travelling state information according to the new transmission parameter, such that the scheduling is more consistent with the moving state of the terminal, and the reported information is more real-time. An optional embodiment of the present disclosure further provides an information sending apparatus. The structural diagram of the information sending apparatus is shown in FIG. 11 and the apparatus mainly includes a second information receiving module 1101 and a second information sending module 1102. The second information receiving module 1101 is configured to receive configuration information sent by a base station, where the configuration information includes at least one of: a transmission resource, a transmission cycle or an active retransmission location. The second information sending module 1102 is configured to send travelling state information according to the configuration information.

The information sending apparatus provided by this embodiment is mounted on a terminal, or is directly mounted on a transport vehicle. In this embodiment, the terminal may be an independent apparatus, and is mounted on the transport vehicle such as a vehicle, a ship, an airplane, an electric vehicle, a bicycle, etc., or is held by a person so as to move or travel; or the terminal may be integrated in other devices and mounted on the above transport vehicle. The terminal may plan a travelling route according to travelling demands, or acquires the travelling route from other devices, for example, acquires a route shared with other devices.

Before the terminal is scheduled, the terminal may actively send a transmission resource allocation request to the base station through the second information sending module 1102, where the transmission resource allocation request may include travelling state information, and may further include other information such as service data volume, time offset, service cycle, and priority of the terminal, such that the server determines the configuration information for the terminal according to the transmission resource allocation request. When the terminal does not actively send the transmission resource allocation request, the terminal can passively wait for the server to determine the configuration information, and then upload the travelling state information of the terminal itself according to the configuration information based on a law.

When the second information sending module 1102 sends the travelling state information of the second information sending module 1102 itself, the second information sending module 1102 may directly send the travelling state information to the current base station, and the base station sends the travelling state information to the server; or the second information sending module 1102 may send the travelling state information to an intermediate device, the prediction result and the travelling state information are directly sent to the base station after the intermediate device predicts a travelling trajectory, and then the base station sends the prediction result and the travelling state information to the server. Further, the second information sending module 1102 may only send route planning information of the second information sending module 1102 itself to the intermediate device, and the intermediate device acquires a current travelling speed and position coordinate information of the terminal through a sensor, a knotmeter, a RSU, GPS equipment, etc.

After the second information receiving module 1101 received the configuration information, the second information receiving module 1101 sends the travelling state information according to the configuration information through the second information sending module 1102. For example, the second information receiving module 1101 sends the travelling state information on corresponding time domain resources and frequency domain resources according to the transmission resource in the configuration information; or the second information receiving module 1101 uploads its own travelling state information once per transmission cycle according to the transmission cycle in the configuration information; or when the configuration information includes the active retransmission location, the second information receiving module 1101 initiates active retransmission when the active retransmission location is reached.

It should be understood that, when the second information sending module 1102 judges that the configuration information includes the active retransmission location, the second information sending module 1102 first calculates a moment at which the terminal travels from a current location to the active retransmission location, and then according to the moment in conjunction with the current travelling speed and transmission cycle, determines a retransmission slot on which the active retransmission needs to be performed, and sends the retransmission slot to the base station. If the retransmission slot is not reached, one ordinary transmission is performed, and if the retransmission slot is reached, the same travelling state information is sent to the base station within continuous T slots, where T is an integer greater than or equal to 2. Through the active retransmission mechanism of the terminal, the information transmission quality is improved, the reliability in the transmission process is increased, and the problem in the related art of the data collision caused by the continuous retransmission of uplink data is avoided.

When the travelling trajectory of the terminal deviates from a predicted traveling trajectory, the server re-predicts the traveling trajectory according to the traveling state information constantly uploaded by the terminal, re-determines the active retransmission location according to the re-predicted traveling trajectory, and notifies the terminal through the base station. After the second information receiving module 1101 receives the new active retransmission location, the second information sending module 1102 re-determines the retransmission slot, sends the re-determined retransmission slot to the base station, and initiates the active retransmission when the re-determined retransmission slot is reached.

The server, after determining the transmission cycle, also determines the transmission reconfiguration cycle according to the transmission cycle, and sends the transmission reconfiguration cycle together with the transmission cycle to the terminal through the base station. When the terminal receives the configuration information including the transmission reconfiguration cycle, the terminal counts number of times of sending the travelling state information by the terminal itself through a second counting module, and judges whether the configuration information delivered by the base station is received before the number of sending times reaches the transmission reconfiguration cycle. When the configuration information is not received and the number of sending times reaches the transmission reconfiguration cycle, the terminal stops sending the travelling state information to the base station, and releases a transmission resource currently used by the terminal; and when the configuration information is received and the number of sending times reaches the transmission reconfiguration cycle, the terminal sends the travelling state information to the base station according to the configuration information, re-counts the number of sending times, and sends the travelling state information to the base station according to the configuration information through the second information sending module 1102. Specifically, the second information sending module 1102 sends the travelling state information to the base station according to the specific content of the configuration information. In condition that the configuration information includes a new transmission resource, the second information sending module 1102 sends the travelling state information to the base station according to the new transmission resource. In condition that the configuration information includes an identifier that notifies the terminal that original configuration is unchanged, the second information sending module 1102 sends the travelling state information to the base station according to the original configuration information.

By counting the number of sending times by the terminal side through the second counting module, the terminal is enabled to automatically stop sending after the number of sending times is reached. For example, when the vehicle cannot successfully receive the configuration information delivered by the base station when travelling out of the cell coverage range, the terminal can automatically stop transmission timely. In addition, counting the number of sending times by the terminal side can enable the terminal user to acquire transmission parameters for the next stage before the transmission in the current stage is finished, preventing the user from actively requesting a grant for reconfiguration after completing the current transmission, so as to ensure the scheduling continuity, so that the transmission of the adjacent two stages can be connected seamlessly and the scheduling reliability can be enhanced.

The information sending apparatus provided by this embodiment enables the terminal to send the travelling state information according to the configuration information delivered by the server, and makes the information sending process more consistent with the mobile characteristics of the terminal, such that the scheduling process is more complete and more flexible.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the solution provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, etc.) to execute the method according to each embodiment of the present disclosure.

Another embodiment of the present disclosure provides a storage medium. The storage medium is mounted on a server. The storage medium stores computer programs. In this embodiment, the computer programs, when executed by a processor, implements the following steps.

Configuration information is determined according to a travelling trajectory of a terminal within a predetermined time period.

The configuration information is sent to a base station to which the terminal currently belongs, where the configuration information includes at least one of: a transmission resource, a transmission cycle or an active retransmission location.

Optionally, before the computer programs are executed by the processor to implement the step of determining the configuration information according to the travelling trajectory of the terminal within the predetermined time period, the computer programs are executed by the processor to implement the following step: acquiring the travelling trajectory of the terminal within the predetermined time period. When the computer programs are executed by the processor to implement the step of acquiring the travelling trajectory of the terminal within the predetermined time period, specifically, the travelling trajectory of the terminal within the predetermined time period can be predicted according to the travelling state information of the terminal, where the travelling state information may include a current travelling speed, current location coordinates, route planning information and the like, and may further include information such as current acceleration, travelling time and the like. Before the computer programs are executed by the processor to implement the step of predicting the travelling trajectory of the terminal with the predetermined time period according to the travelling state information of the terminal, a transmission resource allocation request sent by the base station is received, where the transmission resource allocation request at least includes travelling state information.

When the computer programs in the storage medium are executed by the processor to implement the step of determining the configuration information according to the travelling trajectory of the terminal within the predetermined time period, the computer programs specifically implement the following steps: determining time required for the terminal to move to a handover execution region according to the travelling state information of the terminal, and according to network state information of a target base station on the travelling trajectory, allocating an idle time domain resource and an idle frequency domain resource of the target base station to the terminal; where the handover execution region is a region where the terminal initiates handover, and the target base station is a base station adjacent to the base station to which the terminal currently belongs.

When the computer programs in the storage medium are executed by the processor to implement the step of determining the configuration information according to the travelling trajectory of the terminal within the predetermined time period, the computer programs may further implement the following steps: determining a transmission cycle of the terminal according to the travelling state information of the terminal and a first preset mapping relationship, where the first preset mapping relationship includes a correspondence between a travelling speed in the travelling state information and the transmission cycle. Further, the computer programs are further executed by the processor to implement the following step: determining a new transmission cycle according to the updated travelling state information of the terminal and the first preset mapping relationship, judging whether the new transmission cycle is the same as the transmission cycle of the terminal, and in condition that the new transmission cycle is different from the transmission cycle, replacing the transmission cycle in the configuration information with the new transmission cycle. Optionally, the configuration information may further include a transmission reconfiguration cycle, and after the computer programs are executed by the processor to implement the step of determining the transmission cycle of the terminal according to the travelling state information of the terminal and the first preset mapping relationship, the computer programs are further executed by the processor to implement the following step: determining a transmission reconfiguration cycle of the terminal according to the transmission cycle where the transmission reconfiguration cycle is an integer in the preset reconfiguration interval corresponding to the transmission cycle.

Further, when the computer programs are executed by the processor to implement the step of determining the configuration information according to the travelling trajectory of the terminal within the predetermined time period, the computer programs specifically implement the following step: acquiring N road locations corresponding to the travelling trajectory according to the travelling trajectory; acquiring N average channel gains corresponding to the N road locations in a second preset mapping relationship, where the second preset mapping relationship includes a correspondence between the road location and the average channel gain; and determining a road location whose average channel gain is less than a preset average channel gain threshold as the active retransmission location, where N is an integer greater than or equal to 1, M is an integer greater than or equal to 0, and M is less than or equal to N.

In this embodiment, by means of combining a prediction result of a travelling trajectory of a terminal within a predetermined time period, scheduling information parameter configuration, which complies with a travelling state of the terminal itself, is carried out for the terminal, so that the state of the terminal is acquired more timely, thereby solving the problem in the related art of slow terminal state update caused by inflexible parameter configuration of a scheduling method.

An embodiment of the present disclosure provides a second storage medium. The storage medium is mounted on a base station. The storage medium stores computer programs. In this embodiment, the computer programs, when executed by a processor, implements the following steps.

Configuration information sent by a server is received, where the configuration information includes at least one of: a transmission resource, a transmission cycle, and an active retransmission location.

The configuration information is sent to a terminal.

Optionally, before the computer programs are executed by the processor to implement the step of receiving the configuration information sent by the server, the computer programs are further executed by the processor to implement the following step: receiving a transmission resource allocation request sent by the terminal, where the transmission resource allocation request at least includes travelling state information; and sending the transmission resource allocation request to the server. Before the computer programs implement the step of receiving the configuration information sent by the server, the computer programs may further implement the following step: receiving travelling state information sent by the terminal, and sending the travelling state information to the server. Further, after the computer programs are executed by the processor to implement the step of receiving the travelling state information sent by the terminal, the computer programs specifically further implement the following step: receiving a retransmission slot determined by the terminal according to an active retransmission location; in condition that the retransmission slot is arrived, receiving the travelling state information sent by the terminal for continuous two slot; and performing merge decoding on the travelling state information sent by the terminal and received for the continuous two slots.

When the configuration information includes the reconfiguration cycle, the computer programs stored in the storage medium provided by this embodiment are further executed by the processor to implement the following step: counting the number of transmissions, where the number of transmissions is the number of times of sending the travelling state information by the terminal; before the number of transmissions reaches the transmission reconfiguration cycle, judging whether resource reconfiguration needs to be performed; in condition that the resource reconfiguration needs to be performed, making a request to the server to reconfigure the transmission resource, sending configuration information to the terminal, and restarting counting, where the configuration information comprises a new transmission resource; and in condition that the resource reconfiguration does not need to be performed, making the number of transmissions zero, sending the configuration information to the terminal, and restarting counting, where the configuration information includes an identifier which notifies the terminal that original configuration is unchanged.

In the storage medium provided by this embodiment, the configuration information delivered by the server is timely sent to the terminal, and when parameters such as a transmission cycle, a transmission resource and an active retransmission location change, the terminal is timely notified through the configuration information to report the travelling state information according to the new transmission parameter, such that the scheduling is more consistent with the moving state of the terminal, and the reported information is more real-time.

An embodiment of the present disclosure provides a third storage medium. The storage medium is mounted on a terminal. The storage medium stores computer programs. In this embodiment, the computer programs, when executed by a processor, implements the following steps.

Configuration information sent by a base station is received, where the configuration information includes at least one of: a transmission resource, a transmission cycle or an active retransmission location.

Travelling state information is sent according to the configuration information.

Optionally, before the computer programs are executed by the processor to implement the step of receiving the configuration information sent by the base station, the computer programs are further executed by the processor to implement the following step: sending a transmission resource allocation request to the base station, where the transmission resource allocation request at least includes travelling state information. After the computer programs are executed by the processor to implement the step of receiving the configuration information sent by the base station, the computer programs are further executed by the processor to implement the following step: judging whether the configuration information includes an active retransmission location; in condition that the configuration information includes the active retransmission location, calculating a moment when the active retransmission location is travelled to; determining a retransmission slot according to the moment; and sending the retransmission slot to the base station. Further, after the computer programs are executed by the processor to implement the step of determining the retransmission slot according to the moment, the computer programs are further executed by the processor to implement the following step: judging whether the retransmission slot is arrived; and in condition that the retransmission slot is arrived, sending the same travelling state information to the base station for continuous two slot.

When the configuration information includes the reconfiguration cycle, the computer programs stored in the storage medium provided by this embodiment are further executed by the processor to implement the following step: counting the number of sending times, where the number of sending times is the number of times of sending the travelling state information by the terminal; before the number of sending times reaches the transmission reconfiguration cycle, judging whether the configuration information is received; in condition that the configuration information is not received, stopping sending the travelling state information to the base station, and releasing a transmission resource currently used by the terminal; and in condition that the configuration information is received, making the number of sending times zero, sending the travelling state information to the base station according to the configuration information, and restarting counting. Further, when the computer programs are executed by the processor to implement the step of sending the travelling state information to the base station according to the configuration information, the computer programs are further executed by the processor to implement the following step: in condition that the configuration information includes a new transmission resource, the terminal sends the travelling state information to the base station according to the new transmission resource; and in condition that the configuration information includes an identifier that notifies the terminal that original configuration is unchanged, the terminal sends the travelling state information to the base station according to the original configuration information.

The storage medium provided by this embodiment enables the terminal to send the travelling state information according to the configuration information delivered by the server, and makes the information sending process more consistent with the mobile characteristics of the terminal, such that the scheduling process is more complete and more flexible.

Optionally, the storage medium in the above embodiment may include, but is not limited to, a USB flash disk, a Read-Only Memory (ROM), a Random Access Memory (RAM), a mobile hard disk, a magnetic disk, an optical disk or another medium capable of storing program codes.

Optionally, in this embodiment, a processor performs the steps of the method in the embodiment described above according to the program codes stored in the storage medium. Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and optionally, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

Figure 12:
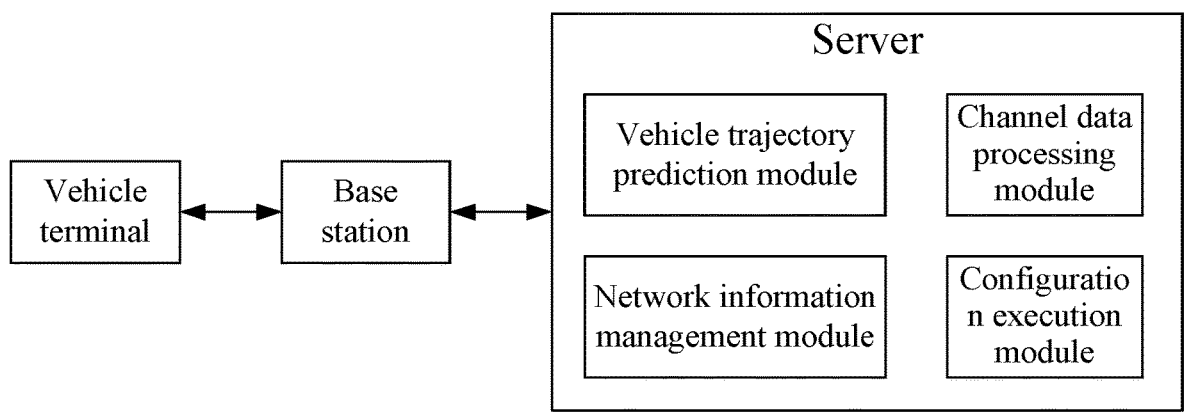
FIG. 12 is a structural diagram of an Internet of Vehicles system according to an embodiment of the present disclosure.

An optional embodiment of the present disclosure uses the Internet of Vehicles (IoV) as an environment, and provides an IoV system. The IoV system is mainly composed of a server, a base station and a vehicle terminal, and the structural diagram of the system is shown in FIG. 12. The server is independently disposed in a wireless access network, establishes a wired or wireless connection with multiple base stations on the roadside, and is responsible for implementing collection, processing and prediction of user information and wireless network information, and related configuration functions of scheduling parameters. The server includes at least four modules: a vehicle trajectory prediction module (equivalent to the function of the acquiring module in the foregoing embodiments of the present disclosure), a channel data processing module (equivalent to the function of the configuring module in the foregoing embodiments of the present disclosure), a network information management module, and a configuration execution module (equivalent to the configuring module in the embodiment of the present disclosure). Each base station and the server perform real-time information interaction through a logic interface. The configuration execution module at the upper layer in the server interacts with the vehicle trajectory prediction module, the channel data processing module and the network information management module at the lower layer through a logic interface.

In some optional embodiments, this embodiment may, based on mobile edge computing (MEC), create a carrier-grade service environment having high efficiency and low delay by using a small MEC server deployed in a radio access network with lower cost as well as base stations under the MEC server, so as to reduce bandwidth consumption of a transmission network, share network center load pressure, and shorten response time of a content delivery system, so that the terminal user enjoys an uninterrupted high-quality network experience.

Figure 13:
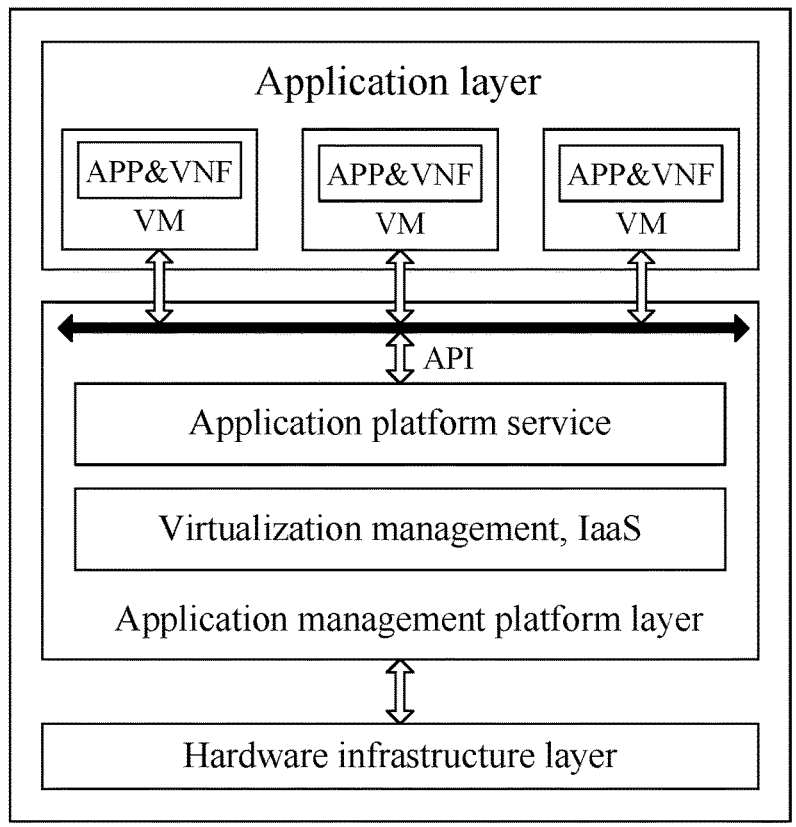
FIG. 13 is a schematic diagram of a server according to an embodiment of the present disclosure.

This embodiment may adopt a network deployment manner based on MEC: a small-scale MEC server cluster is connected to multiple neighboring base stations through a high-rate optical fiber, and the MEC server cluster simultaneously accesses an upper-layer core network. FIG. 13 is a schematic diagram of an MEC server platform. The function of an application platform service is provided for the upper layer through an application programming interface (API). The application layer includes multiple virtual machines (VMs), and each VM runs an application (APP) and implements a virtual network function (VNF) so as to implement functions of acquiring data from the application platform service and performing configuration. The application management platform layer further includes virtualization management and Infrastructure as a Service (IaaS), and interacts with the hardware infrastructure layer. The scheduling method can be used as an MEC APP in the manner of software programming to run on the application layer of the MEC server in the manner of virtual machine. A corresponding vehicle trajectory is predicted. A first mapping table (e.g. the first mapping table in the first embodiment of the present disclosure) and a second mapping table (e.g. the second mapping table in the first embodiment of the present disclosure) are constructed. A base station network information management function is loaded on the application platform layer of the MEC server and used as a platform function component. The function component is further combined and packaged and is provided for the upper layer through an open API in the form of platform service, to support the realization of related operations of parameter configuration such as an upper layer transmission cycle and the like (and other types of IoV functions and applications loaded on the application layer).

Figure 14:
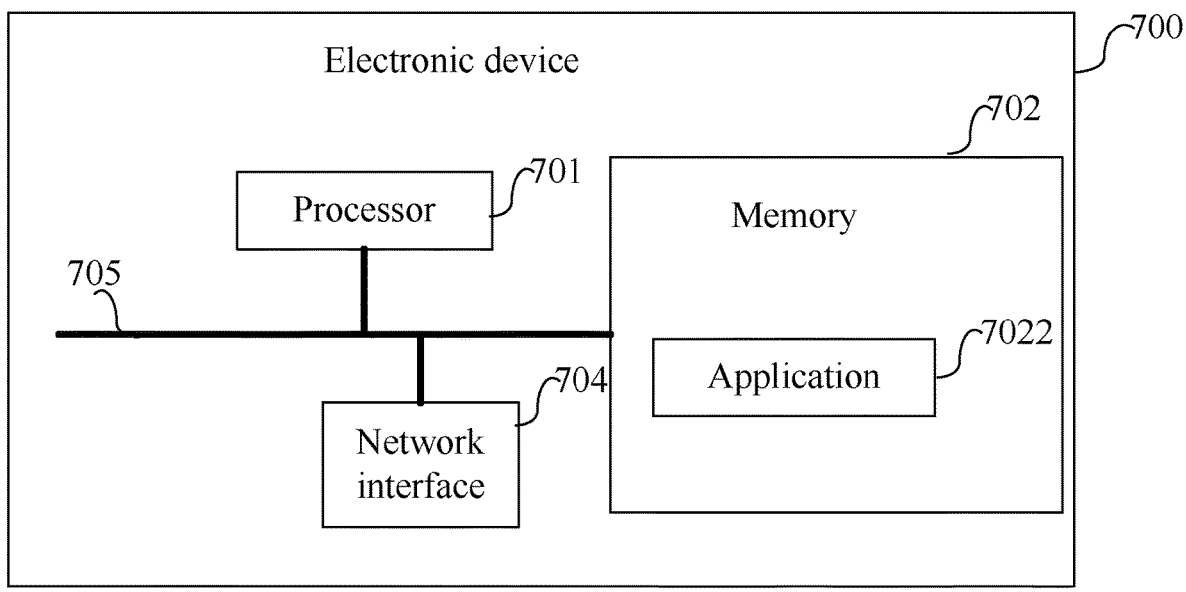
FIG. 14 is a structural diagram of hardware of an electronic device according to an embodiment of the present disclosure.

The process of scheduling the server in this embodiment is the same as the process of the second embodiment of the present disclosure, the process of scheduling the base station in this embodiment is the same as the process of the second embodiment of the present disclosure, and the information sending process of a summary terminal in this embodiment is the same as the process of the above embodiments of the present disclosure, which will not be repeated herein. FIG. 14 is a structural diagram of hardware of an electronic device (e.g. a scheduling apparatus or an information sending apparatus) according to an embodiment of the present disclosure. The electronic device 700 includes at least one processor 701, a memory 702 and at least one network interface 704. Various components in the electronic device 700 are coupled together via a bus system 705. It may be understood that the bus system 705 is configured to implement connections and communications among these components. Besides a data bus, the bus system 705 further includes a power bus, a control bus and a state signal bus. However, for the sake of clarity, various buses are all marked as the bus system 705 in FIG. 14.

The memory 702 in the embodiment of the present disclosure is configured to store various types of data to support operations of the electronic device 700. Examples of the various types of data include any computer program operated on the electronic device 700, such as an application program 7022. Programs for implementing the methods in the embodiments of the present disclosure may be included in the application program 7022.

The methods disclosed by the embodiments of the present disclosure may be applied to the processor 701 or may be implemented by the processor 701. The processor 701 may be an integrated circuit chip with a signal processing capability. In the implementation process, various steps of the methods described above may be performed by an integrated logic circuit of hardware or a software instruction in the processor 701. The processor 701 described above may be a general-purpose processor, a digital signal processor (DSP), any other programmable logic device, a discrete gate or transistor logic device, a discrete hardware component or the like. The processor 701 may implement or execute various methods, steps and logic block diagrams disclosed by the embodiments of the present disclosure. The general-purpose processor may be a microprocessor or any conventional processor. The steps of the methods disclosed by the embodiments of the present disclosure may be directly implemented by a hardware decoding processor, or may be implemented by a combination of hardware and software modules in the decoding processor. The software module may be located in a storage medium which is located in the memory 702. The processor 701 reads information in the memory 702 and implements the steps of the methods described above in combination with hardware of the processor 701.

In an exemplary embodiment, the electronic device 700 may be implemented by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs) or micro processor units (MPUs), or other electronic elements for executing the methods described above.

Although the preferred embodiments of the present disclosure have been disclosed for illustrative purposes, those skilled in the art will appreciate that various modifications, additions and substitutions are possible, and accordingly, the scope of the present disclosure should not be limited to the embodiments set forth above.

What is claimed is:

1. A scheduling method, comprising:
   receiving configuration information sent by a server, wherein the configuration information comprises a transmission cycle and at least one of a transmission resource or an active retransmission location; and
   sending the configuration information to a terminal;
   wherein the configuration information further comprises:
   a transmission reconfiguration cycle, and the transmission reconfiguration cycle is used to reconfigure a value of the transmission cycle.

2. The scheduling method of claim 1, before the receiving the configuration information sent by the server, further comprising:
   receiving a transmission resource allocation request sent by the terminal, wherein the transmission resource allocation request at least comprises travelling state information; and
   sending the transmission resource allocation request to the server.

3. The scheduling method of claim 1, before the receiving the configuration information sent by the server, further comprising:
   receiving travelling state information sent by the terminal; and
   sending the travelling state information to the server.

4. The scheduling method of claim 3, wherein the receiving the travelling state information sent by the terminal comprises:
   receiving a retransmission slot determined by the terminal according to the active retransmission location;
   in condition that the retransmission slot is reached, receiving the travelling state information sent by the terminal within continuous T slots, wherein T is an integer greater than or equal to 2; and
   performing merge decoding on the travelling state information sent by the terminal and received within the continuous T slots.

5. The scheduling method of claim 1, further comprising:
   counting a number of transmissions, wherein the number of transmissions is a number of times of sending the travelling state information by the terminal;
   judging whether resource reconfiguration needs to be performed before the number of transmissions reaches the transmission reconfiguration cycle;
   in condition that the resource reconfiguration needs to be performed, making a request to the server to reconfigure the transmission resource, sending configuration information to the terminal, and restarting counting when the number of transmissions reaches the transmission reconfiguration cycle, wherein the configuration information comprises a new transmission resource; and
   in condition that the resource reconfiguration does not need to be performed, sending configuration information to the terminal, and restarting counting when the number of transmissions reaches the transmission reconfiguration cycle, wherein the configuration information comprises an identifier which notifies the terminal that original configuration is unchanged.

6. The scheduling method of claim 1, wherein the active retransmission location is used to determine a moment of travelling to the active retransmission location, the moment of travelling to the active retransmission location is used to determine a retransmission slot, a moment of the retransmission slot is sent to a base station, and in a case where the moment of the retransmission slot is reached, travelling state information retransmitted by the terminal within T continuous slots are received by the base station, each transmission occupies a corresponding slot within the T continuous slots, and T is an integer greater than or equal to 2.

7. An information sending method, comprising:
   receiving configuration information sent by a base station, wherein the configuration information comprises a transmission cycle and at least one of a transmission resource or an active retransmission location; and
   sending travelling state information according to the configuration information;

wherein the configuration information further comprises:
a transmission reconfiguration cycle, and the transmission reconfiguration cycle is used to reconfigure a value of the transmission cycle.

8. The information sending method of claim 7, before the receiving the configuration information sent by the base station, further comprising:
sending a transmission resource allocation request to the base station, wherein the transmission resource allocation request at least comprises travelling state information.

9. The information sending method of claim 7, after the receiving the configuration information sent by the base station, further comprising:
judging whether the configuration information comprises the active retransmission location;
in condition that the configuration information comprises the active retransmission location, calculating a moment of travelling to the active retransmission location;
determining a retransmission slot according to the moment; and
sending the retransmission slot to the base station.

10. The information sending method of claim 9, after the determining the retransmission slot according to the moment, further comprising:
judging whether the retransmission slot is reached; and
in condition that the retransmission slot is reached, sending same travelling state information to the base station within continuous T slots, wherein T is an integer greater than or equal to 2.

11. The information sending method of claim 7, further comprising:
counting a number of sending times, wherein the number of sending times is a number of times of sending the travelling state information by a terminal;
before the number of sending times reaches the transmission reconfiguration cycle, judging whether the configuration information is received;
in condition that the configuration information is not received and the number of sending times reaches the transmission reconfiguration cycle, stopping sending the travelling state information to the base station, and releasing a transmission resource currently used by the terminal; and
in condition that the configuration information is received and the number of sending times reaches the transmission reconfiguration cycle, sending the travelling state information to the base station according to the configuration information, and restarting counting.

12. The information sending method of claim 11, wherein the sending the travelling state information to the base station according to the configuration information comprises:
in condition that the configuration information comprises a new transmission resource, sending, by the terminal, the travelling state information to the base station according to the new transmission resource; and
in condition that the configuration information comprises an identifier which notifies the terminal that original configuration is unchanged, sending, by the terminal, the travelling state information to the base station according to original configuration information.

13. An information sending apparatus, comprising a processor and a storage device, wherein the storage device stores processor-executable programs, and the programs are configured to, when executed by the processor, implement the information sending method of claim 7.

14. The information sending apparatus of claim 13, wherein the second information sending module is further configured to:
judge whether the configuration information comprises the active retransmission location;
in condition that the configuration information comprises the active retransmission location, calculate a moment of travelling to the active retransmission location;
determine a retransmission slot according to the moment; and
send the retransmission slot to the base station.

15. The information sending apparatus of claim 13, further comprising:
a second counting module, which is configured to count a number of sending times, wherein the number of sending times is a number of times of sending the travelling state information by a terminal; before the number of sending times reaches the transmission reconfiguration cycle, judge whether the configuration information is received; in condition that the configuration information is not received and the number of sending times reaches the transmission reconfiguration cycle, stop sending the travelling state information to the base station, and release a transmission resource currently used by the terminal; and in condition that the configuration information is received and the number of sending times reaches the transmission reconfiguration cycle, restart counting;
wherein the second information sending module is further configured to, in condition that the configuration information is received, send the travelling state information to the base station according to the configuration information.

16. A scheduling apparatus, comprising a processor and a storage device, wherein the storage device stores processor-executable programs, and the programs comprise:
a first information receiving module, which is configured to receive configuration information sent by a server, wherein the configuration information comprises a transmission cycle and at least one of a transmission resource or an active retransmission location; and
a first information sending module, which is configured to send the configuration information to a terminal;
wherein the configuration information further comprises: a transmission reconfiguration cycle, and the transmission reconfiguration cycle is used to reconfigure a value of the transmission cycle.

17. The scheduling apparatus of claim 16, wherein
the first information receiving module is further configured to receive a transmission resource allocation request sent by the terminal, wherein the transmission resource allocation request at least comprises travelling state information; and
the first information sending module is further configured to send the transmission resource allocation request to the server.

18. The scheduling apparatus of claim 16, wherein
the first information receiving module is further configured to receive travelling state information sent by the terminal; and
the first information sending module is further configured to send the travelling state information to the server.

19. The scheduling apparatus of claim 18, wherein the first information receiving module is configured to:

receive a retransmission slot determined by the terminal according to the active retransmission location;

in condition that the retransmission slot is reached, receive the travelling state information sent by the terminal within continuous T slots, wherein T is an integer greater than or equal to 2; and perform merge decoding on the travelling state information sent by the terminal and received within the continuous T slots.

20. The scheduling apparatus of claim 16, further comprising:

a first counting module, which is configured to count a number of transmissions, wherein the number of transmissions is a number of times of sending the travelling state information by the terminal; before the number of transmissions arrives the transmission reconfiguration cycle, judge whether resource reconfiguration needs to be performed; in condition that the resource reconfiguration needs to be performed, make a request to the server to reconfigure the transmission resource, and restart counting when the number of transmissions reaches the transmission reconfiguration cycle; and in condition that the resource reconfiguration does not need to be performed, restart counting when the number of transmissions reaches the transmission reconfiguration cycle; and the first information sending module is configured to, in condition that the resource reconfiguration needs to be performed, send configuration information to the terminal, wherein the configuration information comprises a new transmission resource; and in condition that the resource reconfiguration does not need to be performed, send configuration information to the terminal, wherein the configuration information comprises an identifier which notifies the terminal that original configuration is unchanged.

* * * * *